United States Patent [19]

Kerkman et al.

[11] Patent Number: 5,121,043
[45] Date of Patent: Jun. 9, 1992

[54] PWM CONTROL IN THE PULSE DROPPING REGION

[75] Inventors: Russel J. Kerkman, Milwaukee; Brian J. Seibel, Mequon; David Leggate, West Allis, all of Wis.

[73] Assignee: Allen-Bradley Company, Inc., Milwaukee, Wis.

[21] Appl. No.: 589,846

[22] Filed: Sep. 28, 1990

[51] Int. Cl.$^5$ .............................................. H02P 5/40
[52] U.S. Cl. ..................................... 318/805; 318/811
[58] Field of Search ................. 318/803, 805, 807–811

[56] References Cited

U.S. PATENT DOCUMENTS

| | | | |
|---|---|---|---|
| 3,662,247 | 5/1972 | Schieman | 318/808 |
| 4,047,083 | 9/1977 | Plunkett | 318/807 |
| 4,086,623 | 4/1978 | Jensen | 363/41 |
| 4,096,558 | 6/1978 | Jensen | 363/41 |
| 4,123,692 | 10/1978 | Gilmore et al. | |
| 4,377,779 | 3/1983 | Plunkett | 318/802 |
| 4,419,615 | 12/1983 | Muto et al. | 318/811 |
| 4,480,299 | 10/1984 | Muto et al. | 318/802 |
| 4,490,666 | 12/1984 | Tanamachi et al. | 318/802 |
| 4,527,226 | 7/1985 | Glennon | 363/41 |
| 4,562,524 | 12/1985 | Mutoh et al. | |
| 4,615,000 | 9/1986 | Fujii et al. | |
| 4,685,042 | 8/1987 | Severinsky | |

OTHER PUBLICATIONS

J. Zubek, A. Abbondanti & C. J. Norby, "Pulsewidth Modulated Inverter Motor Drives with Improved Modulation", Transactions on Industry Applications, vol. IA-11, No. 6, Nov./Dec., 1975, pp. 695–703.
D. Grant, R. Seidner, "Technique for Pulse Elimination in Pulsewidth-Modulation Inverters with no Waveform Discontinuity," IEE Proc., vol. 129, Pt. B, No. 4, Jul., 1982, pp. 205–210.
J. A. Houldsworth, D. A. Grant, "The Use of Harmonic Distortion to Increase the Output Voltage of a Three-Phase PWM Inverter," IEEE Transactions on Industry Applications, vol. IA-20, No. 5, Sep./Oct., 1984, pp. 1224–1228.

*Primary Examiner*—David Smith, Jr.
*Attorney, Agent, or Firm*—Quarles & Brady

[57] ABSTRACT

An open loop, volts/hertz motor drive for control of an induction motor adjusts the voltage command to a sine-triangle PWM inverter to compensate for reduction in PWM inverter gain and to compensate for variations in DC bus voltage in the pulse dropping transition region between PWM operation and six-step operation. The drive includes a microelectronic processor interfaces to DC bus voltage sensing circuitry and to the PWM inverter.

8 Claims, 3 Drawing Sheets

PWM CONTROL IN THE PULSE DROPPING REGION

BACKGROUND OF THE INVENTION

1. Field of the Invention

The field of the invention is AC motor drives for variable speed control of AC induction motors, and more particularly, AC motor drives using pulse width modulation (PWM) techniques.

2. Description of the Background Art

A motor drive for an AC induction motor includes a power section and a logic and control section. The power section receives power from a 3-phase AC source operating at 60 Hz frequency. The AC power is converted to DC power to provide a PWM inverter with a source for synthesizing voltages of different frequencies which are necessary to control the speed of an AC motor.

The effective value of the output pulses from a PWM inverter approximates one cycle of a sinusoidal AC waveform. The pattern is repeated to generate additional cycles of the AC waveform.

Signals from the logic and control section of the motor drive are applied to the PWM inverter to control the frequency and magnitude of AC power signals to the motor.

In one type of open-loop PWM motor control, speed commands are translated into torque commands by applying a specified volts/hertz ratio, which can be selected through a user-selectable switch or a jumper wire interfaced to the logic and control section of the motor control. Frequency is determined by speed profiles, referred to as "accel/decel" rates which are selected and adjusted through switches interfaced to the logic and control section of the motor control. Open loop controls of this type are moderate in cost and are widely used in industry for applications requiring low and medium horsepower, and moderate speed range.

In a typical AC open loop motor control, a PWM mode of operation is provided during starting and when running in the constant torque range of operation below base speed. At the upper end of its speed range, in the constant horsepower range of operation, the control operates with a six-step square wave output. PWM operation helps reduce harmonics and torque pulsations at the lower end of the speed range.

The PWM region of operation may also be considered a linear region of operation for the gain of the PWM inverter which determines how much output voltage is applied to the motor in response to a motor voltage command input to the inverter. In the linear region, sine-triangle modulation is complete, and a modulation index (Mi) is less than unity. There is a transition region or pulse dropping region, in which the sine-triangle modulation required for PWM operation is less effective and some pulses of the carrier wave are not effective to modulate the motor voltage command. This transition region precedes a six-step square wave mode of operation for the inverter.

In the non-linear region of inverter operation, the inverter gain drops significantly. While investigations have been made into solving the problem of operation in this region, the present invention provides a simplified model for on-line motor control as transition is made from PWM to sixstep operation.

SUMMARY OF THE INVENTION

The invention relates to a method of motor control in which a phase voltage command controls the input to the PWM inverter in response to a volts/hertz function at low speeds, in which the PWM inverter is a sine-triangle modulator, in which a modulation index is calculated as a ratio of the magnitude of the phase voltage command to the peak of the triangle wave reference to detect a nonlinear region of operation, and in which the voltage command to the PWM inverter is adjusted in the nonlinear region to compensate for reduced gain of the PWM inverter caused by pulse dropping.

Because the modulation index is itself a function of the DC bus voltage, the invention may include the additional step of controlling the phase voltage command in response to variations in the DC bus voltage from rated DC bus voltage.

The largest error in the compensated modulation index occurs for modulation indices from 1.0 to 1.1. In a more detailed aspect of the invention, this error is limited by limiting the maximum gain of the PWM inverter during operation in the pulse-dropping or nonlinear region to the gain of the PWM inverter in the linear region of operation, and limiting the minimum compensated modulation index to the modulation index in the linear region.

The invention is preferably carried out using a solid state PWM inverter and DC bus sensing circuitry interfaced to a microelectronic processor. Digital circuitry offers manufacturing cost advantages in that many of the control functions can be performed by executing programmed routines rather than by processing analog signals. This reduces the size and cost of the circuit components.

While the invention is disclosed in a preferred embodiment as an open-loop, volts/hertz motor drive, the invention may also be practiced in a closed loop control with speed feedback.

Other objects and advantages besides those discussed above shall be apparent to those familiar with the art from the description of several preferred embodiments of the invention which follow. In the description, reference is made to the accompanying drawings, which form a part hereof, and which illustrate examples of the invention. Such examples, however, are not exhaustive of the various embodiments of the invention, and therefore reference is made to the claims which follow the description for determining the scope of the invention.

DETAILED DESCRIPTION OF THE PREFERRED EMBODIMENT

Figure 1:
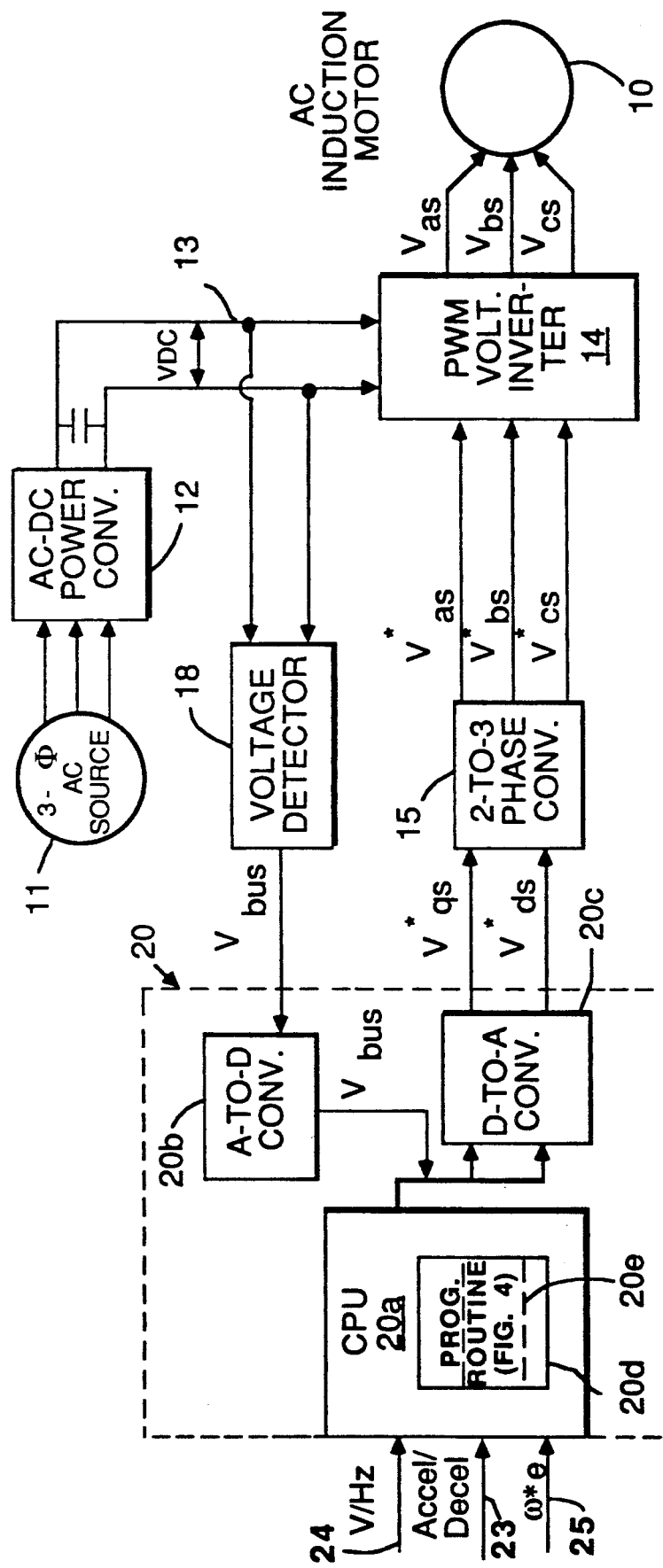
FIG. 1 is a circuit diagram of a motor drive for practicing the method of the invention.

FIG. 1 illustrates a control for carrying out the present invention in controlling an AC induction motor 10. The motor control (also called a "drive") includes a power section that receives AC power at a line frequency of 60 Hz from a 3-phase AC power source 11. The voltage for this example is 460 volts. An AC-DC power converter 12 rectifies the AC power signals from the AC source 11 to produce a DC voltage (VDC) on a DC bus 13 that connects to power inputs on the pulse width modulation (PWM) voltage inverter 14, which completes the power section of the drive. The AC source 11, the AC-DC power converter 12, and DC bus 13 provide a DC source for generating a DC voltage of constant magnitude. A voltage detector 18 is connected to the DC bus 13 to provide an analog input signal $V_{bus}$ to the A-to-D converter 20b.

The PWM inverter 14 includes a group of switching elements which are turned on and off to convert this DC voltage to pulses of constant magnitude. The pulse train pattern from a PWM inverter is characterized by a first set of positive-going pulses of constant magnitude but of varying pulse width and by a second set of negative-going pulses of constant magnitude but of varying pulse width. The RMS or effective value of this pulse train pattern approximates one cycle of a sinusoidal signal which is characteristic of an AC waveform. The pattern is repeated to generate additional cycles of the AC waveform.

To control the frequency and magnitude of the resultant AC power to the motor, AC phase voltage commands are applied to the PWM inverter 14. The PWM voltage inverter 14 receives three balanced AC phase voltage commands, $V^*_{as}$, $V^*_{bs}$ and $V^*_{cs}$ which vary in phase by 120°. The magnitude and frequency of these signals determines the pulse widths and the number of the pulses in pulse trains $V_{as}$, $V_{bs}$ and $V_{cs}$ which are applied to the terminals of the stator.

These phase AC voltage command signals, $V^*_{as}$, $V^*_{bs}$ and $V^*_{cs}$ are produced as a result of a 2-phase to 3-phase conversion which is accomplished with a 2-to-3 phase converter 15. The sinusoidal AC voltage command signals $V^*_{qs}$ and $V^*_{ds}$ have a magnitude and a frequency and are related to a d-q reference frame in which the phase angle of the q-axis component and the phase angle of the d-axis component are 90° apart.

The sinusoidal AC voltage control signals $V^*_{qs}$ and $V^*_{ds}$ are outputs from a microelectronic processor 20, which in this embodiment is preferably a Model 8096 available from Intel Corporation, Santa Clara, Calif. The microelectronic processing unit 20 including CPU 20a, A-to-D converters 20b and D-to-A converters 20c, is programmable to provide functions to be described. The CPU 20a executes a program 20d including an interrupt routine 20e that is stored in nonvolatile memory such as a programmable read only memory (PROM). In executing this program the CPU 20a utilizes a random access memory (RAM) (not shown) to store data and temporary results.

The microelectronic processor 20 calculates the motor voltage command values $V^*_{qs}$ and $V^*_{ds}$ in response to one of several rates of acceleration and deceleration selected at an Accel/Decel input 23. Accel/Decel switches are interfaced at input 23 to the processor 20 to be read by CPU 20a. The magnitude of the motor voltage command is also determined by a voltage/hertz ratio, which is a multiplier applied to the frequency determined by the accel/decel rates. The voltage/hertz ratio is set to a predetermined ratio by connecting a jumper wire on a V/Hz input interface 24 so that an input signal is read by the CPU 20a. Another input 25 ($\omega^*_e$) to the microprocessor 20 in FIGS. 1-3 represents inputs from two potentiometers which determine a range for the operating frequency $\omega^*_e$, such as 0-90 Hz, for example, but expressed in radians ($2\pi \times$ frequency in Hz). Within this range the microprocessor 20 generates various frequency values as the motor is brought up to a rated frequency such as 60 Hz for example.

Figure 2A:
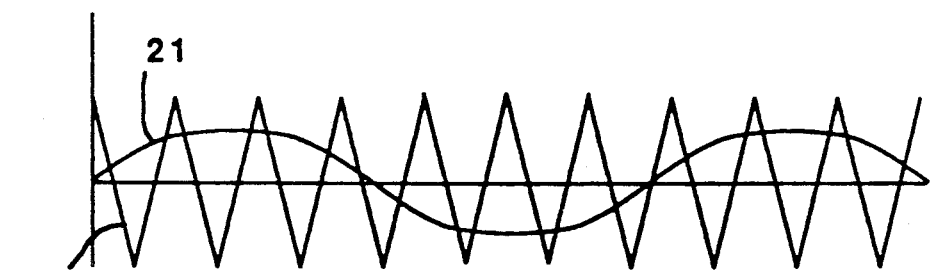
FIGS. 2a–2c are graphs of voltage vs. time each showing a triangle reference waveform and a sinusoidal voltage command waveform in three respective regions of operation: PWM, transition, and six-step operation.
Figure 2B:
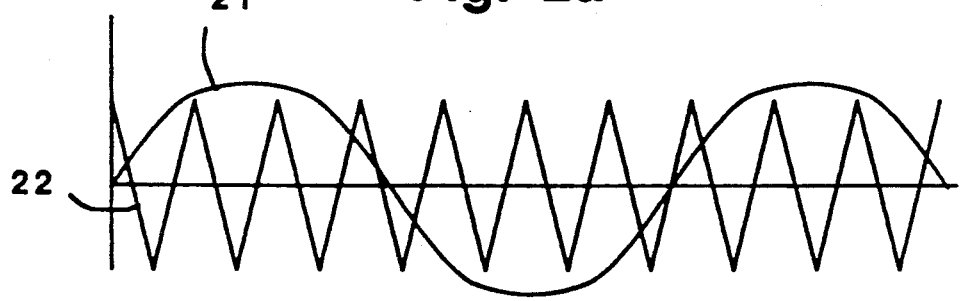
Figure 2C:
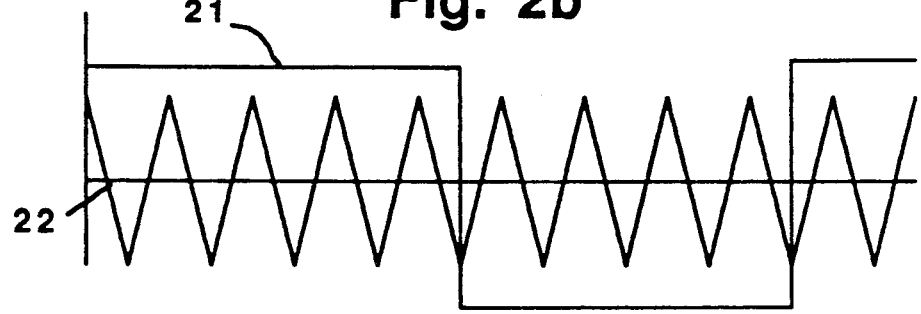
Figure 3:
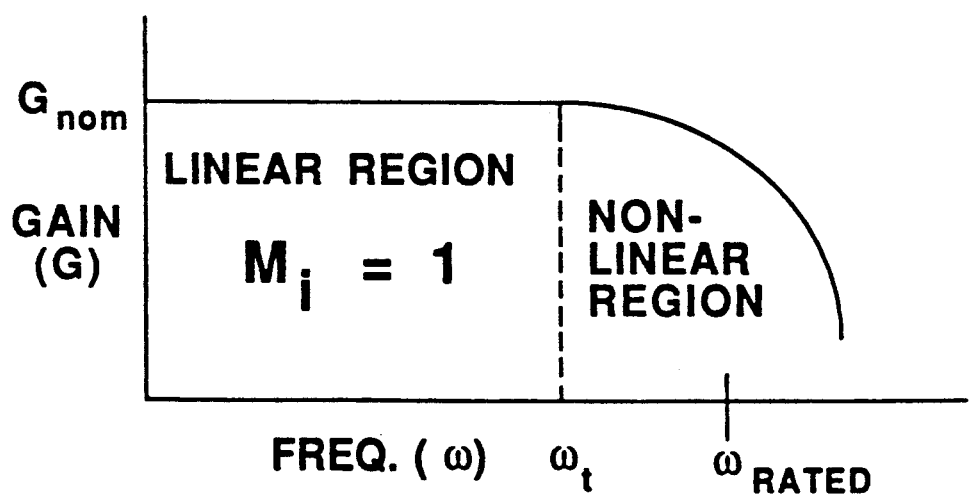
FIG. 3 is a graph of PWM inverter gain as a function of frequency in the linear and nonlinear operating regions.

FIGS. 2a-2c illustrates the behavior of the inverter, when operating in the linear and nonlinear regions. As a motor starts up from zero frequency under Volts/Hz control, it operates in a linear region in which the sine wave command 21 intersects the triangle wave reference 22 for each cycle. The linear region is characterized by full sine-triangle modulation seen in FIG. 2a, i.e., the voltage command sine wave 21 intersects each of the pulses of the triangle wave reference 22. As seen in FIG. 3, the inverter gain (G) remains relatively constant at $G_{nom}$ as speed and frequency of the motor are increased.

At some frequency ($\omega_t$) typically below a rated frequency ($\omega_{RATED}$) which corresponds to base speed for the motor, a nonlinear or pulse-dropping region is encountered. This is the transition region illustrated in FIG. 2b, where some of the pulses of the triangular wave reference 22 are not intersected by the voltage command 21. This results in a pulse being dropped or missed from the output to the motor and is referred to as operation in the "pulse dropping" region. This further results in lower voltage applied to the motor from the outputs of the PWM inverter 14. As seen in FIG. 3, inverter gain (G) drops off substantially in this region, and the output voltage to the motor is less than commanded, unless something is done to offset or respond to the loss of gain.

In industrial settings, the DC bus voltage varies higher or lower than rated voltage (460 volts) due to the electrical load on the power distribution lines. This causes the stator terminal voltage of the motor to go higher or lower.

While investigations have been made into solving these problems, the present invention provides a simplified model for on-line motor control as transition is made from PWM to six-step operation, taking into account variations in DC bus voltage.

FIG. 2c illustrates the region beyond the transition region where virtually no sine-triangle modulation occurs and the drive is operated in a six-step square wave output mode.

This mode is employed at the upper end of the motor speed range, in the constant horsepower range of operation. PWM operation, on the other hand, is employed at lower speeds, in the constant torque range of operation, to reduce harmonic content and inhibit torque pulsations at these speeds.

The nominal gain G nom of the PWM inverter is given by the following equation:

$$G_{nom} = \frac{V_{bus}}{\pi A_t} \quad (1)$$

where $V_{bus}$ = the DC bus voltage (VDC), and $A_t$ = the peak amplitude of the triangular wave.

The transition region can be detected by calculating a modulation index ($M_i$) which is defined as the ratio of voltage command ($V_{com}$) to the peak of the triangular wave ($A_t$) according to the following equation:

$$M_i = \frac{V_{com}}{A_t} \qquad (2)$$

The gain of the inverter for all regions of operation is then described by the following equation:

$$G = G_{nom}\left[ \sin^{-1}\left(\frac{1}{M_i}\right) + \frac{1}{M_i}\sqrt{1 - \frac{1}{M_i^2}} \right] \qquad (3)$$

When the modulation index ($M_i$) is unity, the equation reduces to $G = G_{nom}$, which describes operation in the linear region. In the nonlinear region of operation, the gain is nonlinear and its value depends upon the modulation index. This region begins when the output voltage is equal to $\pi/4$ or the value of fundamental component of the six-step square wave. Six-step operation begins when the modulation index approaches infinity and the inverter gain approaches zero.

When shifting from linear to six-step operation, it is desirable to limit motor current transients. In the present invention, this is accomplished by correcting for bus voltage variation and pulse dropping.

Regardless of the region of operation, if the desired PWM phase output voltage is given by $V^*$, then the PWM phase voltage command $V_{com}$ may be expressed as follows:

$$V_{com} = \frac{V^*}{G} \qquad (4)$$

While the PWM inverter 14 is in the linear region, the amplitude of the phase voltage command $V^*_{LINEAR}$ is the desired phase output voltage $V^*$ divided by the linear gain $G_{nom}$. This follows from Eqs. 1, 3 and 4 when the modulation index ($M_i$) is set to one (1) in Eq. 3. It can now be seen that if DC bus voltage (VDC) varies in Eq. 1, then $G_{nom}$ varies as well. And according to Eq. 4, if the bus voltage increases, G increases and the effective phase voltage command $V_{com}$ should be reduced to maintain the output command $V^*$ at the same value as before the increase in Gain.

Eq. 3 shows that gain (G) will vary as $G_{nom}$ varies with bus voltage, and as the modulation index ($M_i$) varies with pulse dropping. The modulation index is also affected by variations in DC bus voltage (Eq. 2, Eq. 4 and Eq. 1) as well as pulse dropping. This requires that control be accomplished according to a complex relationship to determine the desired phase voltage in the pulse dropping region.

One approach to the problem is to use an iteration method incorporating a look-up table for the gain (G). This method would iterate on the voltage command until the desired output voltage is achieved.

However, this approach has the following disadvantages: The quantization of the gain function accentuates the output voltage discontinuities. The convergence requirements become critical as operation approaches six-step. An iteration method also increases computation requirements.

Instead, the invention uses a compensated modulation index, $M_{icomp}$, which incorporates the effects of bus voltage variation and the reduction in gain. The compensated phase voltage command $V^*_{comp}$ then becomes an algebraic relationship between $M_{icomp}$ and $A_t$ according to the following equation.

$$V^*_{comp} = M_{icomp} A_t \qquad (5)$$

Next, if Eq. 4 is solved for $V^*$, if a binomial expansion is substituted for G, and if Eq. 1 is substituted for $G_{nom}$, then the result is given by Eq. 6. This equation approximates the fundamental component for the inverter, and it incorporates the modulation index ($M_i$) and the DC bus voltage ($V_{bus}$).

$$V^* = \frac{V_{bus}}{\pi A_t}\left[\frac{2}{M_{icomp}} - \frac{1}{3 M_{icomp}^3}\right] V^*_{comp} \qquad (6)$$

The compensated modulation index in Eq. 7 below is obtained from Eq. 6 by substituting Eq. 5 for $V_{com}$ and solving for $M_{icomp}$. Six-step operation commences at the point where the denominator of Eq. 7 becomes equal to zero. By using Eq. 7 a smooth transition from linear to six-step operation is accomplished.

$$M_{icomp} = \frac{1}{\sqrt{6 - \frac{3\pi V^*}{V_{bus}}}} \qquad (7)$$

The largest error in the simplified model occurs for modulation indices from 1.0 to 1.1. To limit the error in this region, the gain in the nonlinear region is limited to be no greater than the gain $G_{nom}$ in the linear region. And, the compensated modulation index ($M_{icomp}$) is limited to be no less than the uncompensated modulation index ($M_i$) in the linear region. These limits can be maintained by limiting the voltage output command ($V^*_{OUT}$) to be no less than $V^*_{LINEAR}$ unless the compensated voltage output command is to be greater than $V^*_{LINEAR}$.

Because the DC bus voltage ($V_{bus}$) and desired voltage ($V^*$) are incorporated, the compensated modulation index ($M_{icomp}$) corrects for bus voltage and desired voltage variations, and pulse dropping. Therefore, by performing the calculations of Eqs. 5 and 7 as part of the program that is executed by the CPU 20a, there is an improved transition from the linear region to six-step operation using a volts/Hz motor drive.

Figure 4:
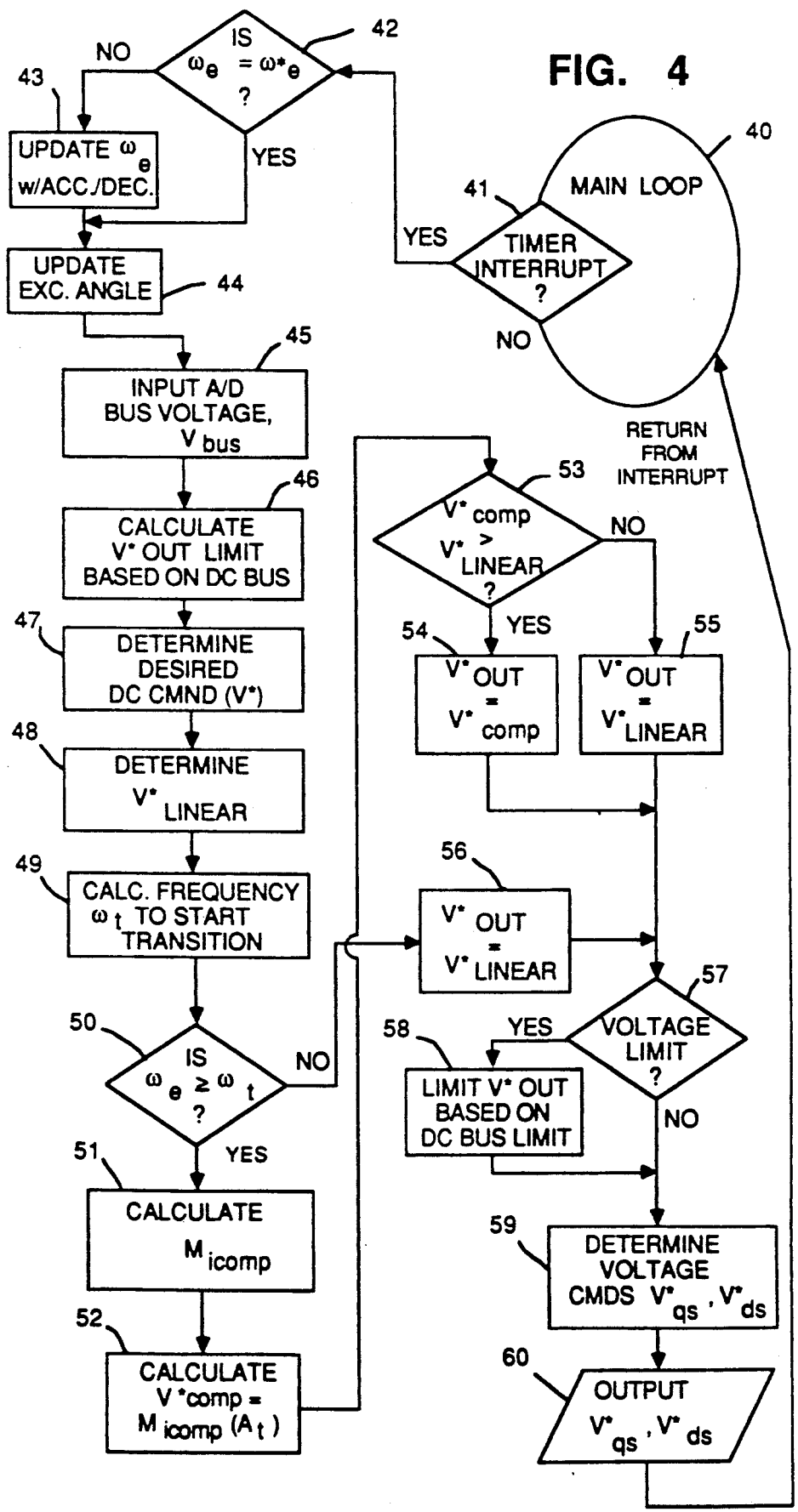
FIG. 4 is a flow chart of a program routine that is executed by a processor shown in FIG. 1.

FIG. 4, shows the program represented by block 20c and the routine represented by area 20d in FIG. 1. As seen in FIG. 4, the program 20c includes a main program loop 40 for handling background functions. As represented by decision block 41, when a timer, which may be a programmable hardware timer or a simply a timing routine in the program, times out and generates an interrupt signal, the CPU 20a branches to an interrupt portion of the microprocessor program.

As represented by decision block 42, the CPU 20a compares the frequency command signal ($\omega_e$) with the present operating frequency signal ($\omega_e$). If these are not equal, this signifies that the operating frequency value ($\omega_e$) must be updated according to the following equation (8), which is shown with the related equation (9) for updating the phase angle of excitation, $\theta_e$:

$$\omega_e(t) = \omega_e(t-1) + \Delta\omega_e \qquad (8)$$

$$\theta_e(t) = \theta_e(t-1) + \omega_e(t)\Delta T \qquad (9)$$

In equations (8) and (9), (t) is a present time and (t−1) is a previous time. The accel/decel rate determines $\Delta\omega_e$ as a function of time. If $\omega^*_e$ is greater than $\omega_e$, then the acceleration factor is applied until $\omega_e$ has come up to the commanded frequency. If $\omega^*_e$ is less than $\omega_e$, then the deceleration factor is applied until $\omega_e$ has dropped down to the commanded frequency. Process block 43 represents the instructions that are executed by the CPU 20a to update the operating frequency value $\omega_e$.

Then, as represented by process block 44, the phase angle is updated. $\theta_e$ is the phase angle or instantaneous value for a function of the form $\sin \theta_e(t)$, and $\Delta T$ is the elapsed time since the last update.

Where $\omega^*_e$ is equal to $\omega_e$ as a result of the comparison represented by decision block 42, no adjustment of the operating frequency is necessary, and the CPU 20a skips block 43 and proceeds to execute process block 44 to update the excitation angle.

After updating frequency and phase angle as necessary, the CPU 20a executes instructions represented by process block 45 to read the DC bus voltage from A-to-D converter 20b. Next, as represented by process block 46, the CPU 20a calculates the theoretical limit for peak line-to-neutral output voltage ($V^*_{LIMIT}$) which is provided by the following equation:

$$V^*_{LIMIT} = \frac{V_{bus}}{2\pi} \quad (10)$$

The CPU 20a next executes instructions represented by block 47 to determine a value for a desired DC motor voltage command $V^*$ according to the following equation:

$$V^* = \omega_e(t)/2\pi \times (V/Hz) \quad (11)$$

where (V/Hz) is the volts/hertz ratio.

As represented by block 48, this result is divided by the linear gain (G) as provided in Eq. (4) above to determine the desired motor voltage command $V^*_{LINEAR}$ for the linear region of operation. As represented by decision block 49, a check is then made to determine whether $\omega_e$ is equal to or greater than the threshold frequency ($\omega_t$) for the transition region. If the result is positive as represented by "YES" branch, the CPU 20a proceeds to execute instructions represented by block 51 to calculate $M_{icomp}$ according to Eq. (7) above. Next, the he CPU 20a proceeds to execute instructions represented by block 52 to calculate $V^*_{comp}$ according to Eq. (5) above. The routine continues to decision block 53, which represents instructions executed by the CPU 20a to compare $V^*_{comp}$ with $V^*_{LINEAR}$ to prevent $V^*_{OUT}$ from being less than $V^*_{LINEAR}$. If $V^*_{comp} > V^*_{LINEAR}$, as represented by the "YES" result, then $V^*_{OUT}$ is set equal to $V^*_{comp}$ calculated in block 52. If $V^*_{comp}$ is less than or equal to $V^*_{LINEAR}$, as represented by the "NO" result, then $V^*_{OUT}$ is set equal to $V^*_{LINEAR}$ determined in block 48. As represented by block 56, $V^*_{OUT}$ is also set equal to $V^*_{LINEAR}$ in the case where the result of the comparison in block 50 is negative, i.e. the motor is still being operated in the linear region of operation.

After the voltage output command has been set to either the compensated value $V^*_{comp}$ or the value in the linear region, it is checked to see that it is within the limits imposed by the DC bus voltage. The value that was calculated through execution of block 46, and is then compared with $V^*_{OUT}$, as represented by decision block 57. If the limit imposed by the DC bus voltage has been exceeded, as represented by the "YES" result from decision block 57, the $V^*_{OUT}$ command is limited on this basis. If the limit has not been exceeded, the routine proceeds as represented by the "NO" result branch to block 59. Next, instructions are executed, as represented by block 59, to convert from $V^*_{OUT}$ to the phase voltage commands $V^*_{qs}$ and $V^*_{ds}$, which are related to the q-axis and d-axis, respectively, and which are 90° apart in phase. Finally, as represented by output block 60, these are converted to analog signals through the D-to-A converters 20c and transmitted to the phase converter 15. This completes the cycle of the interrupt routine and the CPU 20a is returned to the main loop routine 40.

This description has been by way of examples of how the invention can be carried out. Those with knowledge in the art will recognize that various details may be modified in arriving at other detailed embodiments, and that many of these embodiments will come within the scope of the invention. Therefore to apprise the public of the scope of the invention and the embodiments covered by the invention the following claims are made.

We claim:

1. A method for regulating a PWM inverter that controls a phase voltage output applied to an induction motor having a stator and rotor, the method comprising:

generating a phase voltage command to the PWM inverter in response to a voltage/frequency function, wherein the voltage/frequency function relates a plurality of predetermined magnitudes of the phase voltage command to a plurality of predetermined frequencies of operation of the induction motor;

controlling the phase voltage output from the PWM inverter in response to comparing two inputs to the PWM inverter, wherein a first input comprises a plurality of pulses of a phase voltage command and wherein the second input is a triangular wave reference;

calculating a modulation index as a ratio of one of the magnitudes of the phase voltage command to a peak of the triangle wave reference;

detecting nonlinear operation of the PWM inverter in which the modulation index is in a range extending from unity to greater than unity;

calculating a compensated modulation index which is responsive to variations of gain of the PWM inverter operating in the nonlinear region; and adjusting the phase voltage command to the PWM inverter during nonlinear operation in response to the compensated modulation index to control a phase voltage output applied to the stator and to compensate for variations in gain of the PWM inverter during operation in the nonlinear region.

2. The method of claim 1, further comprising:
   sensing a DC bus voltage for power supplied to the PWM inverter; and
   further comprising the step of controlling the phase voltage output in response to variations in the DC bus voltage from rated voltage for the DC bus.

3. The method of claim 1, further comprising
   the step of sensing a DC bus voltage for power supplied to the PWM inverter;
   wherein the compensated modulation index is further calculated as a function of the DC bus voltage; and
   wherein the phase voltage command to the PWM inverter is controlled in response to the compensated modulation index and variations in DC bus voltage.

4. The method of claim 3, further comprising the steps of limiting the maximum gain of the PWM inverter during nonlinear operation to the gain of the PWM inverter for a linear region of operation where the modulation index is unity; and limiting the minimum compensated modulation index during nonlinear operation to the modulation index for linear operation.

5. An electronic motor control for regulating a PWM inverter that controls a phase voltage output applied to an induction motor having a stator and rotor, the electronic motor control comprising:

a PWM inverter for controlling the phase voltage output in response to comparing two inputs, wherein a first input comprises a plurality of cycles of a phase voltage command and wherein the second input is a triangular wave reference;

means for generating a phase voltage command to the PWM inverter in response to a voltage/frequency ratio wherein the voltage/frequency function relates a plurality of predetermined magnitudes of the phase voltage command to a plurality of predetermined frequencies of operation of the induction motor;

means for calculating a modulation index as a ratio of one of the magnitudes of the phase voltage command to a peak of the triangle wave reference;

means for calculating a compensated modulation index based on the modulation index, wherein the compensated modulation index is responsive to variations in gain of the PWM inverter operating in the nonlinear region;

means for detecting operation of the PWM inverter in a nonlinear region where the modulation index is in a range extending from unity to greater than unity; and means for adjusting the phase voltage command to the PWM inverter as a function of the compensated modulation index in response to detecting operation in the nonlinear region, to control a phase voltage output applied to the stator and to compensate for reduced gain of the PWM inverter during operation in the nonlinear region.

6. The motor control of claim 5, further comprising means for sensing a DC bus voltage for power supplied to the PWM inverter; and wherein the means for adjusting the phase voltage command to the PWM inverter includes means for further controlling the phase voltage command in response to fluctuations in the DC bus voltage from nominal or rated DC bus voltage.

7. The motor control of claim 5, wherein the means for adjusting the phase voltage command to the PWM inverter during operation in the nonlinear region includes means for calculating the compensated modulation index as a function of the DC bus voltage.

8. The motor control of claim 7, further comprising means for limiting the maximum gain of the PWM inverter during operation in the nonlinear region to the gain of the PWM inverter in a linear region of operation where the modulation index is unity; and means for limiting the minimum compensated modulation index to the modulation index experienced during operation preceding entry into the nonlinear region of operation.

* * * * *

UNITED STATES PATENT AND TRADEMARK OFFICE
CERTIFICATE OF CORRECTION

PATENT NO. : 5,121,043

DATED : June 9, 1992

INVENTOR(S) : Kerkman, Seibel, Leggate

It is certified that error appears in the above-identified patent and that said Letters Patent is hereby corrected as shown below:

TITLE PAGE:
In the Abstract,
line 7            "interfaces" should be --interfaced--.

Column 6, line 58   "$(\omega_e)$" should be --$(\omega^*_e)$--.

Signed and Sealed this

Twentieth Day of July, 1993

Attest:

MICHAEL K. KIRK

*Attesting Officer*      *Acting Commissioner of Patents and Trademarks*